(12) United States Patent
Zhang et al.

(10) Patent No.: US 11,665,511 B2
(45) Date of Patent: May 30, 2023

(54) GROUP DISPATCHING METHOD FOR A TRUNKING COMMUNICATION SYSTEM, COMMUNICATION SYSTEM AND STORAGE MEDIUM

(71) Applicant: HYTERA COMMUNICATIONS CORPORATION LIMITED, Shenzhen (CN)

(72) Inventors: Junqi Zhang, Shenzhen (CN); Jin Liao, Shenzhen (CN); Haibo Zhu, Shenzhen (CN); Qiang Liu, Shenzhen (CN)

(73) Assignee: HYTERA COMMUNICATIONS CORPORATION LIMITED, Shenzhen (CN)

( * ) Notice: Subject to any disclaimer, the term of this patent is extended or adjusted under 35 U.S.C. 154(b) by 153 days.

(21) Appl. No.: 17/245,008

(22) Filed: Apr. 30, 2021

(65) Prior Publication Data

US 2021/0250733 A1 Aug. 12, 2021

Related U.S. Application Data

(63) Continuation of application No. PCT/CN2018/116253, filed on Nov. 19, 2018.

(30) Foreign Application Priority Data

Nov. 1, 2018 (CN) .......................... 201811296617.7

(51) Int. Cl.
*H04W 4/06* (2009.01)
*H04W 76/15* (2018.01)
(52) U.S. Cl.
CPC ............. *H04W 4/06* (2013.01); *H04W 76/15* (2018.02)

(58) Field of Classification Search
CPC .......... H04W 4/06; H04W 4/08; H04W 4/10; H04W 76/15
See application file for complete search history.

(56) References Cited

U.S. PATENT DOCUMENTS

2007/0201376 A1 8/2007 Marshall-Wilson
2009/0215411 A1* 8/2009 Tucker .................. H04W 84/08
455/90.2

(Continued)

FOREIGN PATENT DOCUMENTS

CN 101340646 A 1/2009
CN 101594576 A 12/2009

(Continued)

OTHER PUBLICATIONS

Chinese First office action, Chinese Application No. 201811296617.7, dated Feb. 3, 2021 (12 pages).

(Continued)

*Primary Examiner* — Raymond S Dean

(57) ABSTRACT

A group dispatching method for a trunking communication system, a communication system and a storage medium are provided. The system comprises an interconnection server, a system server and at least one voice dispatch console. The method comprises: establishing a call connection between the first communication terminal and the interconnection server, selecting an idle voice dispatch console as a service access point, transmitting a second call establishment message to the idle voice dispatch console wherein the first call establishment message corresponds to a group call initiated by the first communication terminal to a target group, establishing a call connection between the idle voice dispatch console and the interconnection server when the idle voice dispatch console receives the second call establishment message, and the idle voice dispatch console estab- (Continued)

lishing a call connection to the target group through the system server to receive and transmit voice.

14 Claims, 12 Drawing Sheets

(56) References Cited

U.S. PATENT DOCUMENTS

| | | | | |
|---|---|---|---|---|
| 2013/0157708 A1* | 6/2013 | Economy | ............... | H04W 48/18 |
| | | | | 455/518 |
| 2013/0229982 A1* | 9/2013 | Ma | .................... | H04W 56/0015 |
| | | | | 370/328 |
| 2016/0135024 A1* | 5/2016 | Väisänen | ............... | H04W 76/38 |
| | | | | 455/414.1 |
| 2016/0143075 A1* | 5/2016 | Tucker | ................ | H04L 63/0823 |
| | | | | 370/329 |
| 2016/0269876 A1* | 9/2016 | Senese | ................. | H04L 65/104 |

FOREIGN PATENT DOCUMENTS

| | | | |
|---|---|---|---|
| CN | 102333282 A | 1/2012 | |
| CN | 104469723 A | 3/2015 | |
| CN | 104601552 A | 5/2015 | |
| CN | 106028296 A | 10/2016 | |
| WO | WO-2018037235 A1 * | 3/2018 | ............ H04W 12/00 |

OTHER PUBLICATIONS

International search report, International Application No. PCT/CN2018/116253, dated Jul. 25, 2019 (13 pages).

* cited by examiner

GROUP DISPATCHING METHOD FOR A TRUNKING COMMUNICATION SYSTEM, COMMUNICATION SYSTEM AND STORAGE MEDIUM

CROSS REFERENCE

The present application is a continuation-application of International (PCT) Patent Application No. PCT/CN2018/116253, filed on Nov. 19, 2018, which claims foreign priority of Chinese Patent Application No. 201811296617.7, in the title of "Group Dispatching Method For A Trunking Communication System, Communication System and Storage Medium", filed on Nov. 1, 2018, in the National Intellectual Property Administration of China, the entire contents of which are hereby incorporated by reference in its entirety.

TECHNICAL FIELD

The present disclosure generally relates to communication technology, and in particular to a group dispatching method for a trunking communication system, a communication system and a storage medium.

BACKGROUND

In construction of a domestic private network communication system, for example, Police Digital Trunk (PDT) and Long Term Evolution (LTE), sometimes an legacy private network system such as Mobile Private Trunking (MPT) and Trans European Trunked Radio (Tetra) has already been installed and is in use. In this situation, the new private network communication system needs to interconnect and intercommunicate with the legacy one. Currently, a constructed private network communication system usually comprises corresponding hand-held radios, vehicle radios and dispatch consoles. The car radios and the hand-held radios may generally access to the private network communication system through wireless stations, and the dispatch consoles may usually access to a trunking system through Internet Protocol (IP) links.

The inventors of the present disclosure found that, currently existing legacy trunking communication systems are mainly private systems of manufacturers. These systems are private and closed and are not open to other manufacturers, and a new system cannot access to the system server of a legacy trunking communication system. Currently, for the interconnection of a new communication system and an legacy communication system, if multiple groups need to be interconnected, multiple car radio singling process devices need to be added in the interconnection network, the car radios need to access to the legacy communication system and are required to be placed at different stations. Since each car radio can work only in one channel and be used for one interconnection group, this method cannot support dynamic interconnection. When there are many interconnection groups with low actual currency value, the car radio resources cannot be reused for calling, which is a waste of hardware resources. As the number of interconnection groups increases, new hardware devices need be added, and each call occupies one channel of a station. Besides, the implementation of the conventional method is very difficult. Different car radios should be implemented under different stations, otherwise channel resources of one station are easily used up. Moreover, maintenance of the system is very difficult. When an error occurs during interconnection, device inspection is required at the station.

SUMMARY

Accordingly, the present disclosure aims to provide a group dispatching method for a trunking communication system, a communication system and a storage medium. The implementation of the present disclosure may make the best use of multiple dispatch consoles to support multiple call services.

In one aspect of the present disclosure, a group dispatching method for a trunking communication system is provided. The trunking communication system comprises an interconnection server, a system server and at least one voice dispatch console. The method comprises: the interconnection server receiving a first call establishment message from another trunking communication system other than said trunking communication system, wherein the first call establishment message corresponds to a group call from a first communication terminal of the another trunking communication system to a target group, wherein the target group comprises a plurality of second communication terminals; upon receipt of the first call establishment message by the interconnection server, the interconnection server establishing a call connection between the first communication terminal, selecting an idle voice dispatch console from the at least one voice dispatch console as a service e access point, and transmitting a second call establishment message to the idle voice dispatch console, wherein the second call establishment message comprises a group call number of the target group; and upon receipt of the second call establishment message by the idle voice dispatch console, the interconnection server establishing a call connection with the idle voice dispatch console, and establishing a call connection with a second communication terminal of the target group in said trunking communication system through the system server so as to transmit and receive voice.

In yet another aspect of the present disclosure, a storage medium is provided. The storage medium is configured to store computer programs, which, when executed by a processor, are configured to achieve the above-described group dispatching method for the trunking communication system.

In another aspect of the present disclosure, a communication system is provided. The trunking communication system comprises an interconnection server, a system server and at least one voice dispatch console. The interconnection server configured to receive a first call establishment message initiated by a first communication terminal in another trunking communication system to a target group, wherein the another trunking communication system does not belong to the trunking communication system, wherein the target group comprises a plurality of second communication terminals; wherein upon receipt of the first call establishment message, the interconnection server establishes a call connection with the first communication terminal, selects an idle voice dispatch console from at least one voice dispatch console as a service access point, and transmits a second call establishment message to the idle voice dispatch console, wherein the second call establishment message comprises a group call number of the target group. The system server is configured to establish connection between the voice dispatch console and a second communication terminal of the target group in the trunking communication system. The voice dispatch console is configured to, when the at least one voice dispatch console receives the second call establishment message, establish a call connection with the interconnection server, and establish a call connection to the second communication terminal of the target group in the trunking communication system through the system server so as to transmit and receive voice.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Figure 1:
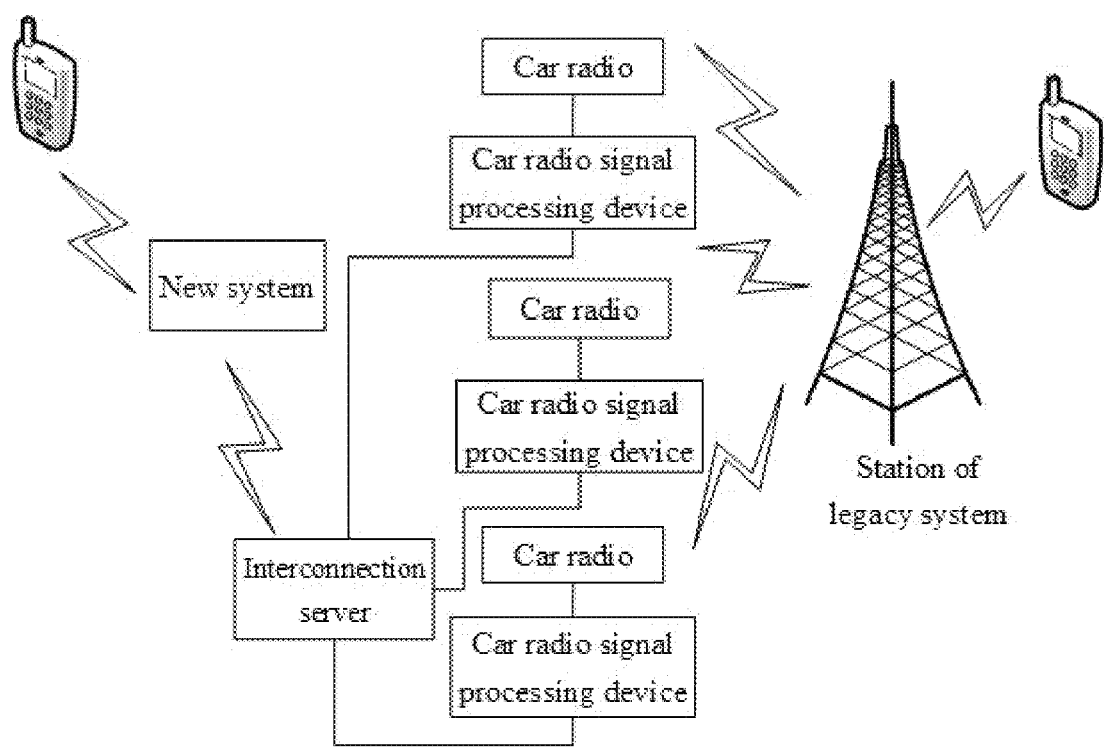
FIG. 1 illustrates an interconnection structure of a new communication system and an legacy communication system based on conventional method.

In most domestic interconnection methods between a new communication system and an legacy system, a special car radio signal processing device is developed, to which a car radio is linked. By input a particular (or required) frequency, the car radio can be added in a corresponding group of the legacy communication system to achieve interconnection of one group, as shown in FIG. 1. If multiple groups need to be interconnected, multiple car radio signal process devices need be added in the interconnection network, and the multiple car radios need access to the legacy communication system. One car radio corresponds to one group of the legacy communication system and interconnects with a group of the new communication system. If a hundred groups need to be interconnected, a hundred car radios and car radio signal processing devices are required. Since implementing car radios and car radio signal processing device under one station may use up signal channel resources of the station, each car radio should be implemented in a different station. This method cannot achieve dynamic interconnection and cannot make the best use of car radio resources for call services. It brings waste of hardware resources, and its implementation and maintenance are very difficult.

For example, a legacy trunking communication system of Tetra system often comprises a station, a system server, a dispatch console and a communication terminal. When the communication terminal initiates a call, the station receives the call request and transmits the call message to the system server that processes the call request. The dispatch console may monitor specified calls through the system server. When a corresponding call occurs, the system server may inform the dispatch console, and the dispatch console may be configured to initiate or receive calls. For example, communication terminals of car radios and hand-held radios often access to the private network communication system through the station wirelessly. The dispatch console often accesses to the trunking system server through IP links. An legacy trunking communication system is usually a specified system of the manufacturer. This system is closed and not open to other manufacturer. Thus, the dispatch console cannot access to the system server of the legacy trunking communication system directly. However, the control interface of the dispatch console in the trunking communication system is usually open to users for facilitating user function customization. Embodiments of the present disclosure flexibly use the dispatch console of an legacy trunking communication system and use it as resource for interconnection. In some embodiments, some of the dispatch consoles may be used as monitoring dispatch consoles while some of the dispatch consoles are sued as voice dispatch consoles. When a monitoring dispatch console monitors a call event in the legacy communication system, it may select an idle dispatch console and add it into the monitored call. The voice dispatch console may establish voice link to transmit voice and release the voice link when the call is ended. In this way, the call dispatch consoles may be made the best use of and achieve the dynamic interconnection effect.

The trunking communication system described in embodiments of the present disclosure may comprise, but is not limited to, PDT system, Tetra system, Integrated Digital Enhanced Network (iDEN) system, Global Open Trunking Architecture (GOTA), and GT800 system of Huawei.

Figure 2:
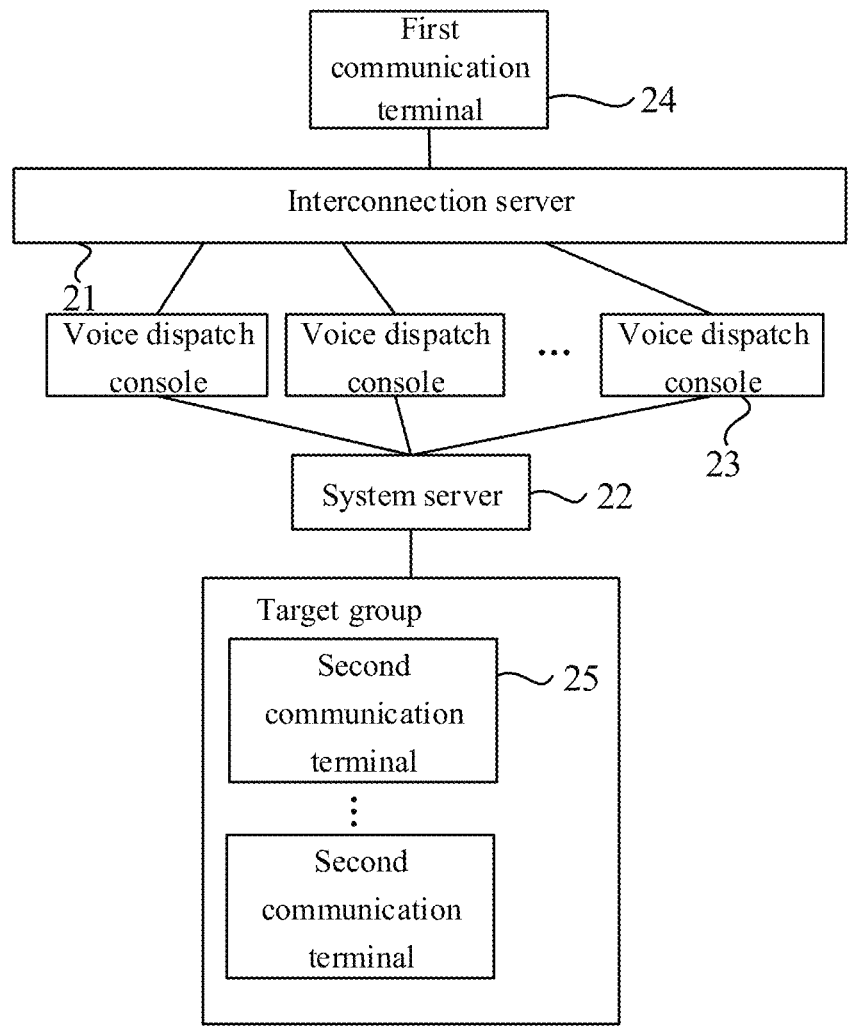
FIG. 2 is a schematic diagram of a trunking communication system according to an embodiment of the present disclosure.

Referring to FIG. 2, FIG. 2 is a schematic diagram of a trunking communication system according to an embodiment of the present disclosure. The communication system 20 may comprise an interconnection server 21, a system server 22 and at least one voice dispatch console 23.

The interconnection server 21 may connect to second trunking communication system which does not belong to the trunking communication system, and be configured to receive a first call establishment message corresponding to a group call. The first call establishment message is transmitted from a first communication terminal 24 in the second trunking communication system to a target group. The target group may comprise multiple second communication terminal 25. When the interconnection server 21 receives the first call establishment message, a call connection between the first communication terminal 24 and the interconnection server 21 is established, an idle voice dispatch console 23 is selected from the voice dispatch consoles 23 as a service access point, and a second call establishment message is transmitted to the idle voice dispatch console 23. The second call establishment message may comprise a group call number of the target group.

The interconnection server 21 may connect to other devices in any wired or wireless method. For the convenience of user customization, a dispatch console in the trunking communication system is usually arranged with a corresponding interface for access and control of the dispatch console. Thus, the interconnection server 21 adopt different communication protocol for the access of the dispatch console based on types of different trunking communication systems. It is appreciated that adopting corresponding communication protocol for the access of the dispatch console is well known in the art and will not be repeated herein.

The system server 22 may be configured to establish connection between the second communication terminal 25 of the target group and the dispatch console 23. In the trunking communication system, the system server 22 may be used to process communication services of terminals, e.g., to receive a call from a dispatch console, hand-held radio, car radio or other communication terminal, and to transmit the call to a target communication terminal such that terminals in the trunking communication system may be connected through the system server 22. Rules of calls may be set in the system server 22. It can be configured to, for example, when the corresponding group call number of a specific group call is received, inform a specific dispatch console.

The voice dispatch console 23 may be configured to, upon receipt of the second call establishment message, establish a call connection between the idle voice dispatch console 23 and the interconnection server 21, and to establish a call connection to the second communication terminal 25 of the target group in the trunking communication system through the system server 22 so as to receive and transmit voice.

Specifically, the operation of establishing the call connection between the voice dispatch console 23 and the target group in the trunking communication may comprise that the voice dispatch console 23 establishes the call connection through the system server 22 which provides services to the second communication terminal 25 of the target group for voice calls.

According to the present disclosure, multiple voice dispatch consoles 23 may be controlled for voice calls by using the interconnection server 21. When the interconnection service is activated and a group call is required between the first communication terminal 24 and the second communication terminal 25 of the target group, a voice dispatch console 23 may be dynamically selected for calling the target group. Thus, call services may be achieved, and communication resources may be made the best use of.

It should be understood, apart from the forgoing components, the trunking communication system may further comprise other components in the art, for example, a station for receiving wireless signal from or transmitting wireless signal to a communication terminal, or a repeater for relaying signal. The omitting of these components does not prevent those of ordinary skills in the art from understanding embodiments of the present disclosure, and thus these components will not be explained herein.

Figure 3:
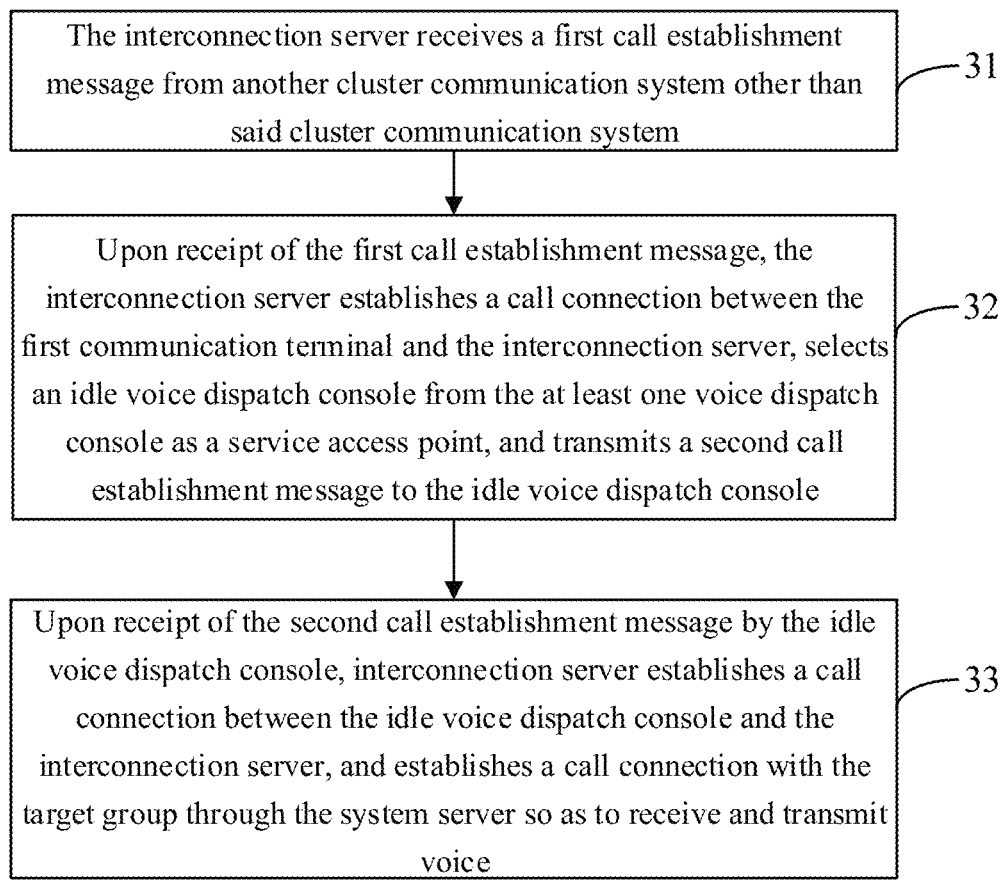
FIG. 3 is a flowchart of a group dispatching method for a trunking communication system according to a first embodiment of the present disclosure.

Referring to FIGS. 2 and 3, FIG. 3 is a flowchart of a group dispatching method for a trunking communication system according to a first embodiment of the present disclosure. The method may be implemented in the trunking communication system described in the forgoing embodiment. The method may comprise operations described in blocks 31-33.

Block 31: An interconnection server 21 receives a first call establishment message from another trunking communication system.

The first call establishment message may correspond to a group call from a first communication terminal 24 in the trunking communication system to a target group.

It can be understood, the second communication terminal 25 of the target group may comprise a communication terminal of the trunking communication system or a communication terminal of other communication systems. The group call number of target groups in the trunking communication system may be different from that of other trunking communication systems. The corresponding relation between the group call number of the target group in the trunking communication system and the group call number of the target group in other communication systems may be stored in the interconnection server 21.

The first communication terminal 24 may initiate a group call to the target group, and transmit the first call establishment message to the interconnection server 21 so as to establish a call to the target group in the trunking communication system.

Block 32: Upon receipt of the first call establishment message, the interconnection server 21 establishes a call connection between the first communication terminal 24 and the interconnection server 21, selects an idle voice dispatch console 23 from at least one voice dispatch console 23 as a service access point, and transmit a second call establishment message to the idle voice dispatch console 23.

The system server 22 may store corresponding information of the target group in the trunking communication system. Upon receipt of the first call establishment message, the interconnection server 21 may select one idle voice dispatch console 23 from the at least one voice dispatch console 23 to initiate a call, and transmit a second call establishment message to the voice dispatch console 23. The second call establishment message may comprise a group call number of the target group for calling the target group.

Status information indicating whether a voice dispatch console 23 is idle may be stored in the interconnection server 21 or other device coupled to the interconnection server 21, and thus the interconnection server 21 may select one idle voice dispatch console 23 from the at least one voice dispatch console 23. In should be understood, the status of the voice dispatch console(s) 23 described in embodiments of the present disclosure may be determined in other ways, which is not limited herein.

Moreover, the interconnection server 21 may convert the group call number of a target group in other trunking communication system into the group call number of the target group in the trunking communication system, locate the second communication terminal corresponding to the target group in the trunking communication system, and eventually establish a call connection between the second communication terminal 25 of the target group in the trunking communication system and the first communication system 24 of the target group in other trunking communication system.

Block 33: Upon receipt of the second call establishment message, the idle voice dispatch console 23 establishes a call connection between the idle voice dispatch console 23 and the interconnection server 21, and establishes a call connection to the second communication terminal 25 of the target group in the trunking communication system through the system server 22 so as to receive and transmit voice.

Upon receipt of the second call establishment message, the voice dispatch console 23 establishes a call connection between the interconnection server 21 and the voice dispatch console 23, and establishes connection between the target group and the system server 22 such that the second communication terminal 25 may call the first communication terminal 24. Thus, call services between trunking communication systems can be achieved.

Figure 4:
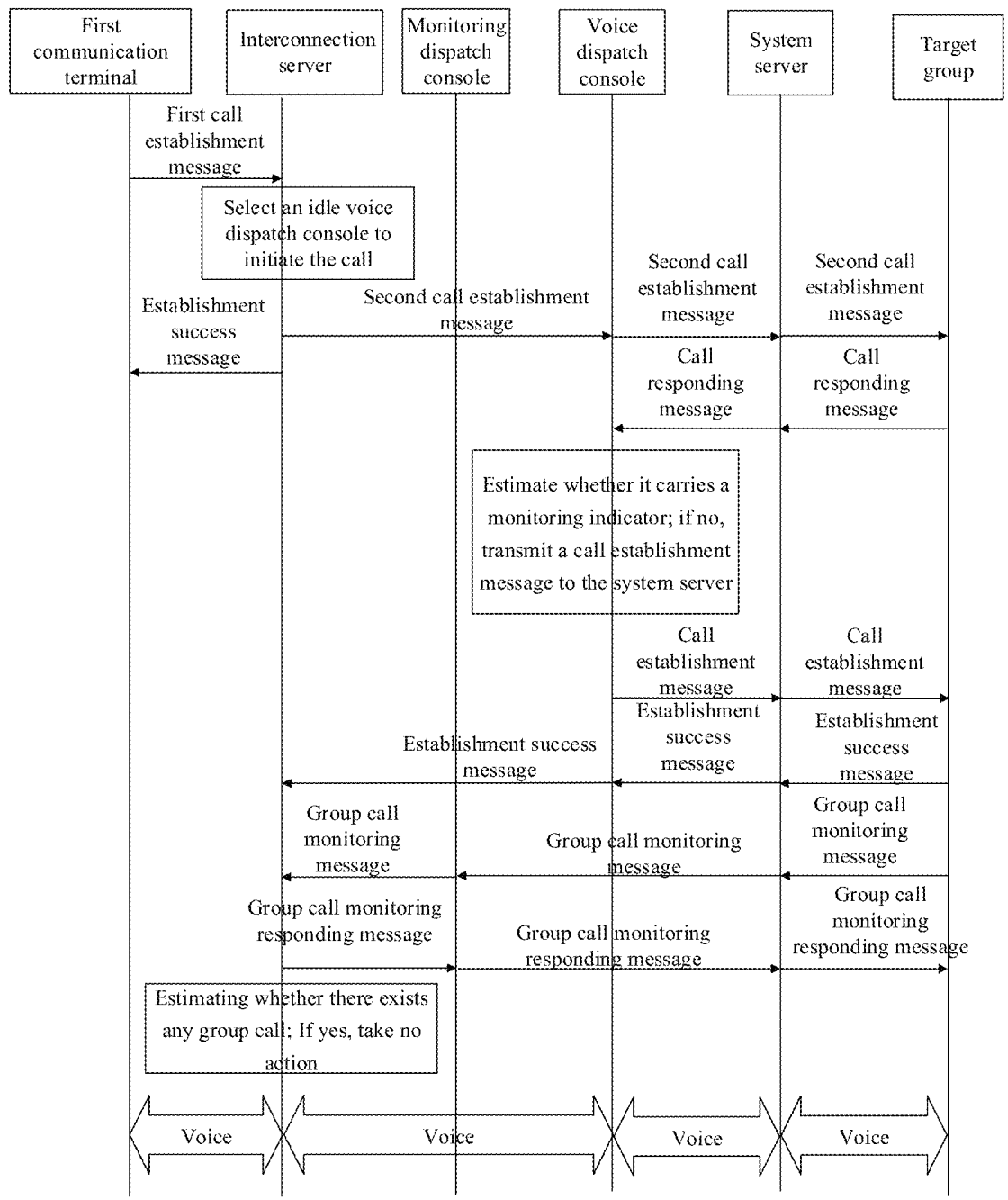
FIG. 4 is a flowchart of a group dispatching method for a trunking communication system according to a second embodiment of the present disclosure.
Figure 5:
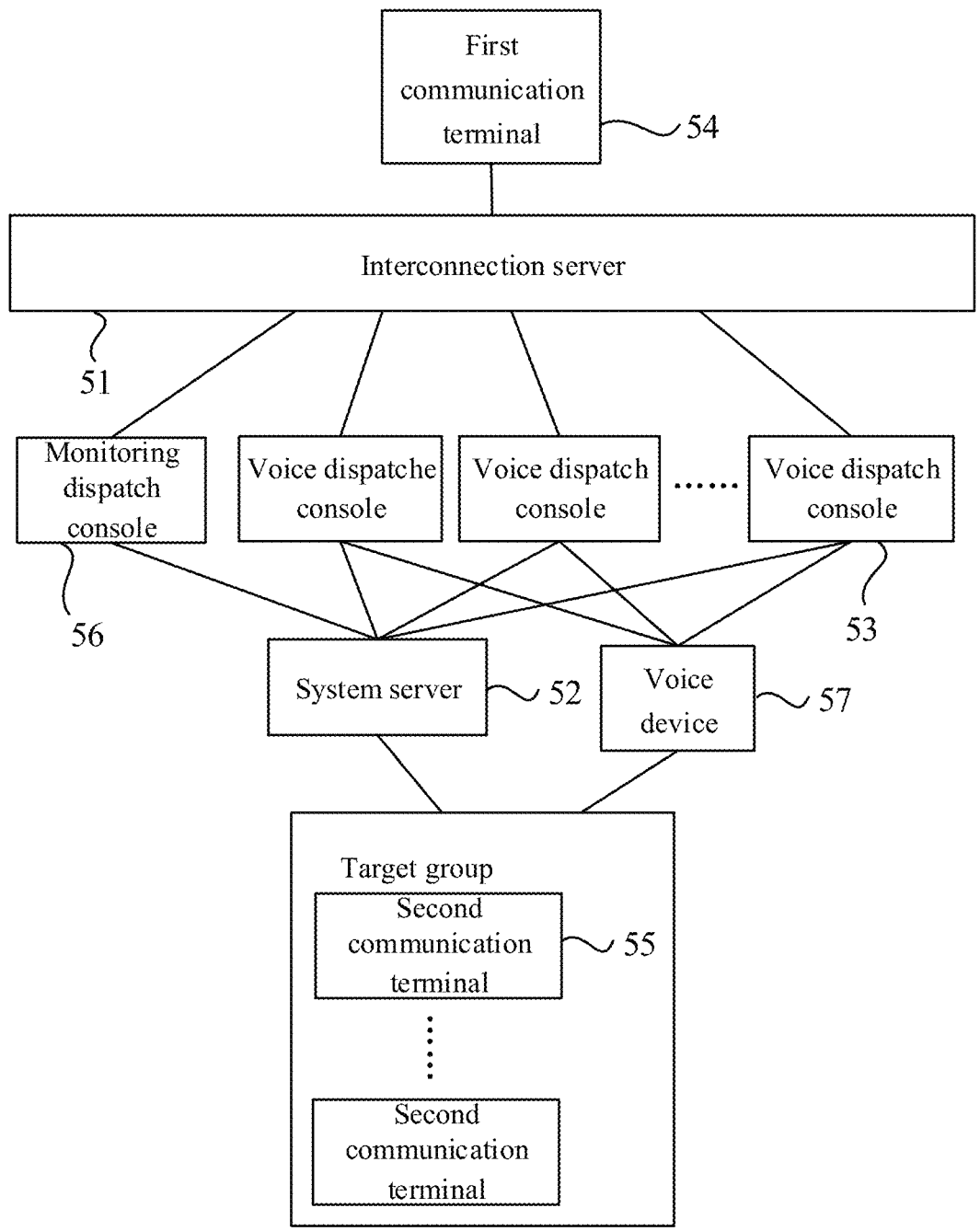
FIG. 5 is a schematic diagram of a communication system according to another embodiment of the present disclosure.

Referring to FIGS. 4 and 5, FIG. 4 is a flowchart of a group dispatching method for a trunking communication system according to a second embodiment of the present disclosure. The method may be implemented in a communication system, which comprises an interconnection server 51, a system server 52, at least one voice dispatch console 53, a monitoring dispatch console 56 and a voice device 57. This embodiment describes a process that a first communication terminal 54 requests to establish a group call to a target group in the trunking communication system. The method may comprise operations described in blocks 41-48.

Block 41: The first communication terminal 54 transmits a first call establishment message to the interconnection server 51.

The system server 52 connects to the voice dispatch console 53, the monitoring dispatch console 56 and the target group in the trunking communication system. The voice device 57 connects to the voice dispatch console 53 and the target group.

Block 42: Upon receipt of the first call establishment message, the interconnection server 51 selects an idle voice dispatch console 53 to initiate the call.

The interconnection server 51 selects one idle voice dispatch console 53 and initiates the call to the target group.

Block 43: The interconnection server 51 transmits a second call establishment message and an establishment success message to the voice dispatch console 53 and the first communication terminal 54 respectively.

After the interconnection server 51 initiates the call, the second call establishment message and the establishment success message are transmitted to the voice dispatch console 53 and the first terminal respectively. The second call establishment message does not comprise any monitoring indicator.

Block 44: The voice dispatch console 53 transmits the second call establishment message to the target group in the trunking communication system through the system server 52 based on the second call establishment message.

Upon receipt of the second call establishment message, the voice dispatch console 53 transmits the second call establishment message to the system server 52, and the system server 52 re-transmits this message to the target group in the trunking communication system.

Block 45: The second communication terminal 55 of the target group transmits a call responding message to the voice dispatch console 53.

Upon receipt of the second call establishment message, the second communication terminal 55 of the target group return a call responding message to the voice dispatch console 53. That is, the second communication terminal 55 of the target group transmits the call responding message to the voice dispatch console 53 through the system server 52.

Block 46: The voice dispatch console 51 verifies whether the second call establishment message establishment message carries a monitoring indicator. If not, the voice dispatch console 53 transmits a call establishment message to the target group.

Upon receipt of the second call establishment message from the interconnection server 51, the voice dispatch console 53 verifies whether the second call establishment message carries a monitoring indicator. If the second call establishment message does not carry a monitoring indicator, the voice dispatch console 53 initiates the call, that is to say, transmit a call establishment message to the second communication terminal 55 through the system server 52.

Block 47: The target group transmits an establishment success message and a group call monitoring message to the interconnection server 51 through the voice dispatch console 53 and the monitoring dispatch console 56 respectively.

Upon receipt of the call establishment message, the target group return a responding message (i.e., the establishment success message) to the voice dispatch console 53. The voice dispatch console 53 transmits this message to the interconnection server 51. Furthermore, the target group transmits the group call monitoring message to the interconnection server 51 through the system server 52 and the monitoring dispatch console 56.

Block 48: Upon receipt of the group call monitoring message, the interconnection server 51 transmits a group call monitoring responding message to the target group.

Upon receipt of the group call monitoring message transmitted by the monitoring dispatch console 56, the interconnection server 51 return a group call monitoring responding message to the target group through the monitoring dispatch console 56 and the system server 52.

The interconnection server 51 determines whether there exists an ongoing group call. If yes, it does not take any action. The first communication terminal 54 and multiple second communication terminals 55 utilize the interconnection server 51, the voice dispatch console 53 and the system server 52 to transmit voice messages.

In one embodiment, in order to achieve dynamic interconnection between groups of PDT and Tetra systems, a communication system may be provided. The system server 52 of the communication system may be a Tetra connectivity server (TCS) and use the Tetra Voice Gateway (TVG) to access as the voice device 57. Voice of the dispatch console is transmitted to the TVG in the way of IP link. The TVG connects to a digital exchange of Tetra through E1 protocol (European 30-channel pulse code modulation) for transmitting voice. The digital exchange of Tetra creates a controller for the voice resources of each dispatch console. Each controller controls the number of channels of voice calls of the dispatch console. One dispatch console may achieve calling in one channel and monitoring voice in different channels. Under the limitation of time slot of E1 protocol, the number of voices transmitted by the TVG device is limited, and it is possible to utilize sixty dispatch consoles maximum to make calls and transmit voice simultaneously. When two hundred groups are configured to be interconnected, sixty channels maximum can be utilized for concurrency calls.

According to the present disclosure, the dispatch console in the trunking communication system may be utilized as resources for interconnection so as to achieve multi-channel dynamic concurrency. One dispatch console (e.g., the monitoring dispatch console 56) may be taken as a monitoring interface, and multiple dispatch consoles (e.g., the voice dispatch consoles 53) may be taken as voice interfaces. The monitoring interface may be utilized to monitor calls in the trunking communication system, and the voice interfaces may be utilized for actual voice calls. Under the limitation of the trunking communication system itself, the method uses less voice links but achieves interconnection between more groups. Based on the present disclosure, multiple groups may be interconnected simultaneously, and all groups may transmit voice in a wired way, which may reduce the number of required equipment, avoid the word lost problem during air-interface voice transmitting, save hardware resources, and facilitate future maintenance.

Figure 6:
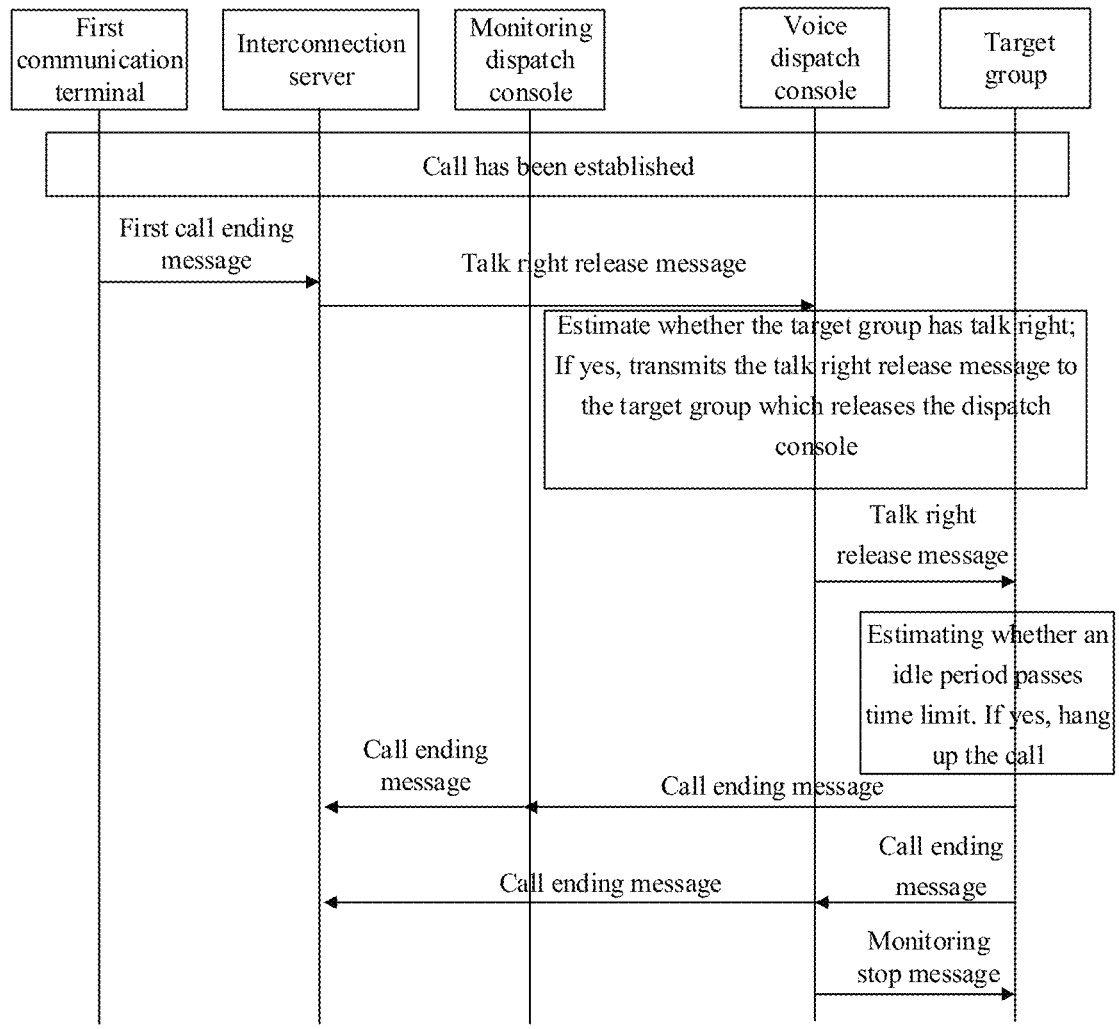
FIG. 6 is a flowchart of a group dispatching method for a trunking communication system according to a third embodiment of the present disclosure.

Referring to FIGS. 5 and 6, FIG. 6 is a flowchart of a group dispatching method for a trunking communication system according to a third embodiment of the present disclosure. This embodiment describes the process that the first communication terminal 54 hangs up the group call with the target group in the trunking communication system. The method comprises operations described in blocks 61-63.

Block 61: The first communication terminal 54 transmits a first call ending message to the interconnection server 51 through the voice dispatch console 53.

After a period of call between the first communication terminal 54 and the multiple communication terminals 55 in the trunking communication system and when the user of the first communication terminal 54 wants to end the call, the first communication terminal 54 may receive an instruction of hanging up the group call and may transmit a first call ending message to the interconnection server 51.

Block 62: Upon receipt of the first call ending message, the interconnection server 51 transmits a talk right release message to the voice dispatch console 53.

After hanging up the call, the first communication terminal 54 reports the first call ending message to the interconnection server 51. The interconnection server 51 transmits a talk right release request to the voice dispatch console 53.

Block 63: The voice dispatch console 53 estimates whether the second communication terminal 55 of the target group has talk right. If yes, the target group ends the call when idle call period is longer than a preset period, and transmits a call ending message to the interconnection server 51. The voice dispatch console 53 stops monitoring the target group.

Upon receipt of the talk right release message, the voice dispatch console 53 estimates whether the dispatch console of the target group has talk right. If yes, the voice dispatch console 53 releases the talk right of the dispatch console, transmit the talk right release message to the second communication terminal 55 of the target group. When an idle period passes time limit, the call ending message is transmitted to the interconnection server 51 through the voice dispatch console 53 and the monitoring dispatch console 56 respectively. The voice dispatch console 53 stops monitoring the target group in the trunking communication system.

When idle time of group call in the trunking communication system exceeds time limit, the group call of this group is automatically ended. That is, if no one speaks and the idle period passes the preset period, the group call is hanged up. The call ending message is transmitted to the voice dispatch console 53 and the monitoring dispatch console 56. The voice dispatch console 53 and the monitoring dispatch console 56 both report the received message to the interconnection server 51, but the interconnection server 51 does not take any action. Furthermore, the voice dispatch console 53 stops monitoring upon receipt of the call ending message, and transmits monitoring stop message to the trunking communication system so as to achieve the end of group call.

Figure 7:
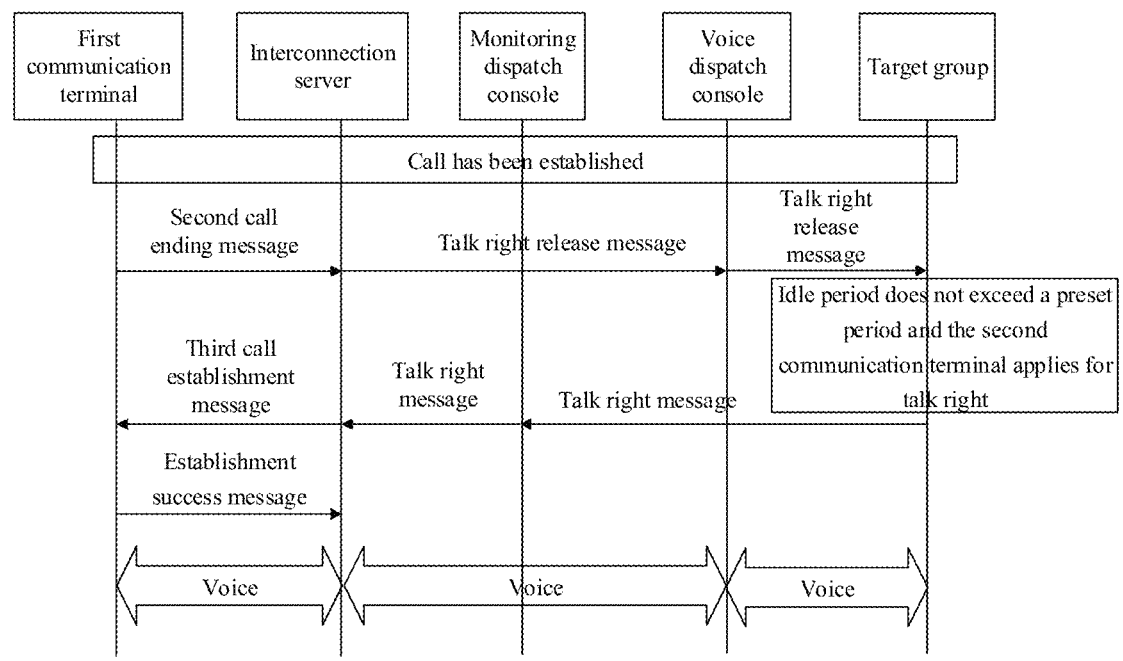
FIG. 7 is a flowchart of a group dispatching method for a trunking communication system according to a fourth embodiment of the present disclosure.

Referring to FIGS. 5 and 7, FIG. 7 is a flow chart of a group dispatching method for a trunking communication system according to a fourth embodiment of the present disclosure. This embodiment describes the process that the first communication terminal 54 hangs up the group call to the target group in the trunking communication system. The method comprises operations described in blocks 71-75.

Block 71: The first communication terminal 54 transmits a second call ending message to the interconnection server 51.

The interconnection server 51 receives the second call ending message sent by the first communication terminal 54.

Block 72: Upon receipt of the second call ending message, the interconnection server 51 transmits a talk right release message to the voice dispatch console 53.

The interconnection server 51 transmits a talk right release request to the voice dispatch console 53 based on the second call ending message.

Block 73: The voice dispatch console 53 estimates whether the second communication terminal 55 of the target group has talk right.

Block 74: When an idle period does not exceed a preset period and the second communication terminal 55 applies for talk right, a talk right message is transmitted to the interconnection server 51 through the monitoring dispatch console 56.

The voice dispatch console 53 estimates whether the target group in the trunking communication system has talk right. If yes, when an idle period of the target group in the trunking communication system does not exceed the preset period and the second communication terminal 55 applies for talk right, a talk right message is transmitted to the interconnection server 51 through the monitoring dispatch console 56.

After the first communication terminal 54 transmits the call ending message, the interconnection server 51 only send talk right release to the target group in the trunking communication system. If the idle period of the target group in the trunking communication system does not reach the preset period and a second communication terminal 55 in the trunking communication system applies for talk right, a talk right message is reported to the interconnection server 51 through the monitoring dispatch console 56 for applying for talk right. At this time, the interconnection server 51 estimates that the call group of the first communication terminal 54 has been hanged up, and the interconnection server 51 will re-establish the call to the first communication terminal 54.

Block 75: Upon receipt of the talk right message, the interconnection server transmits a third call establishment message to the first communication terminal 54, and establishes a call connection between the first communication terminal 54 and the interconnection server 51.

Upon receipt of the talk right message transmitted by the monitoring dispatch console 56, the interconnection server 51 transmits a third call establishment message to the first communication terminal 54. The first communication terminal 54 returns an establishment success message to the interconnection server 51. The first communication terminal 54 restart the call to the target group of the trunking communication system.

In the condition that the first communication terminal 54 transmits the call ending request, when the trunking communication system estimates the idle period does not passes time limit and the second communication terminal 55 applies for talk right, the trunking communication system re-establishing the call to the first communication terminal 54, which achieves re-establishment of the group call.

Figure 8:
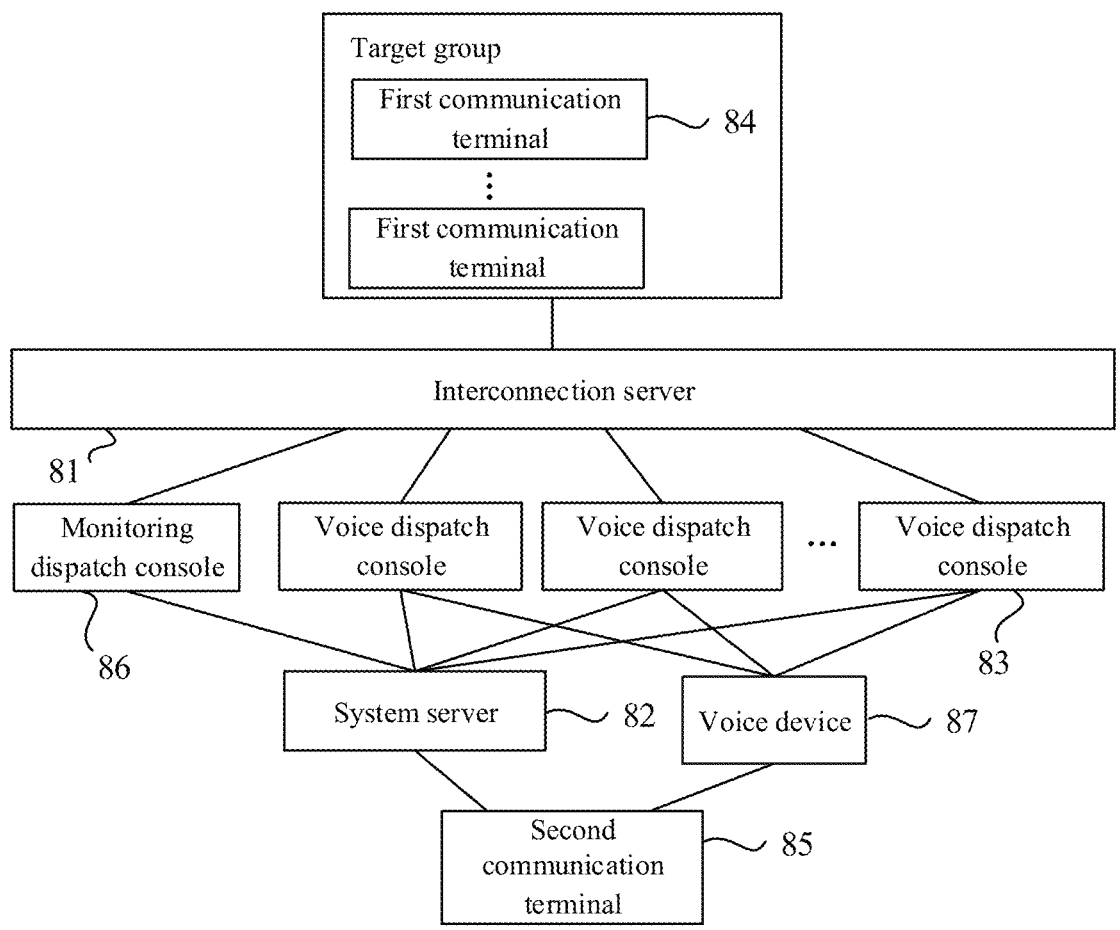
FIG. 8 is a schematic diagram of a communication system according to yet another embodiment of the present disclosure.

Referring to FIG. 8, FIG. 8 illustrates a schematic diagram of a trunking communication system according to another embodiment of the present disclosure. The communication system 80 may comprise an interconnection server 81, a system server 82, at least one voice dispatch console 83 and a monitoring dispatch console 86.

The monitoring dispatch console 86 may be utilized to monitor group calls from the second communication terminal 85 in the trunking communication system to the target group. When the monitoring dispatch console 86 monitors that the second communication terminal 85 initiates a group call to the target group, it transmits a fourth call establishment message to the interconnection server 81. The fourth call establishment message comprises the group call number of the target group in the trunking communication system. The target group comprise multiple communication terminals.

The interconnection server 81 connects to another trunking communication system which is not the trunking communication system. The interconnection server 81 is configured to, upon receipt of the fourth call establishment message, establish a call connection to a communication terminal of the target group in the another trunking communication system, select an idle voice dispatch console 83 from the at least voice dispatch console 83 as a service access point, and transmit a fifth call establishment message to the idle voice dispatch console 83.

The system server 82 is configured to establish connection between the voice dispatch console 83 and the communication terminal of the target group in the trunking communication system.

The voice dispatch console 83 is configured to, upon receipt of the fifth call establishment message, establish a call connection between an idle voice dispatch console 83 and the interconnection server 81. The idle voice dispatch console 83 establishes a call connection to the second communication terminal 85 through the system server 82 so as to receive and transmit voice.

It should be understood, a same target group may have different group call numbers in two trunking communication systems, that is, there may exist corresponding relation between the group call number of a target group in one trunking communication system and the group call number of a target group in another trunking communication system. Specifically, the interconnection server 81 stores the corresponding relation between the group call number of the target group in the trunking communication system and the group call number of the target group in another trunking communication system. When the second communication terminal 85 calls the target group in the trunking communication system, the interconnection server 81 converts the group call number of the target group in the trunking communication system into the group call number of the target group in the another trunking communication system, locates the first communication terminal 84 of the target group in the another trunking communication system, and eventually establishes a call connection between the second communication terminal 85 of the target group in the trunking communication system and the first communication terminal 84 of the target group in the another trunking communication system.

According to the present disclosure, the interconnection server 81 may be utilized to control the monitoring dispatch console 86 for monitoring so as to monitor call events inside the trunking communication system. Multiple voice dispatch console 83 may be controlled to run voice calls. When the interconnection service is activated, cooperation between the multiple voice dispatch console 83 and the monitoring dispatch console 86 may be utilized to dynamically select a voice dispatch console 83 to call the target group when the second communication terminal 83 performs the group call with the target group. Therefore, call services may be achieved, and the method may make the best use of resources.

Figure 9:
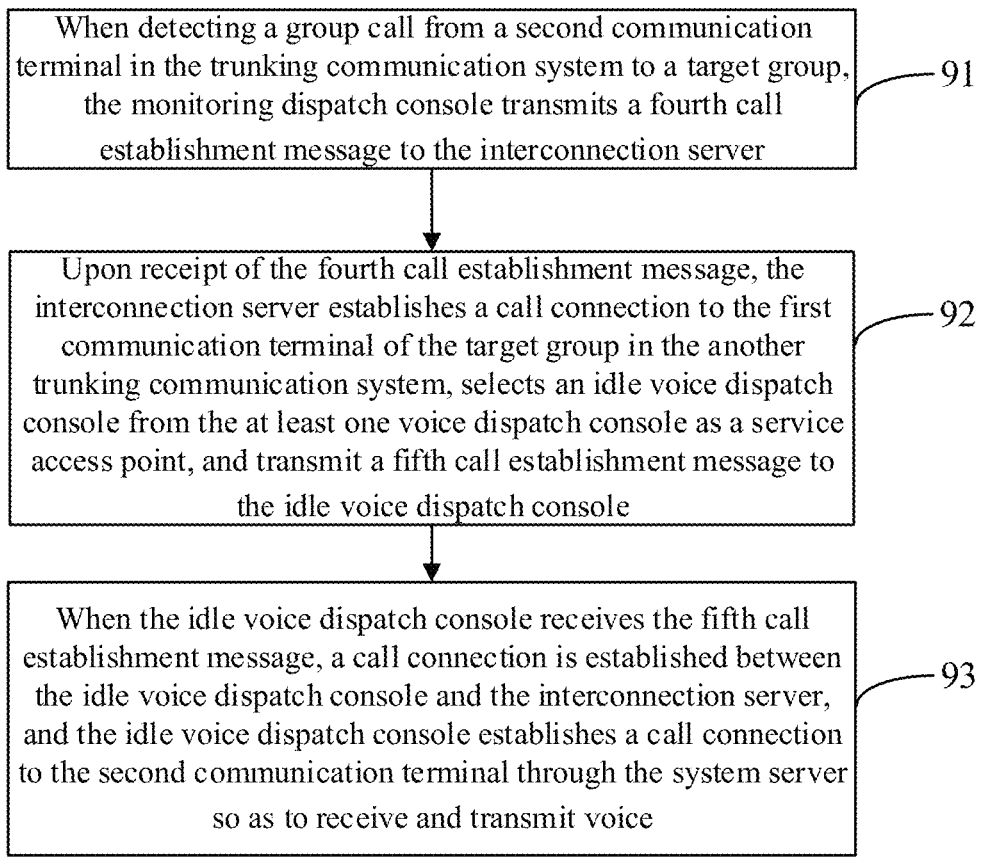
FIG. 9 is a flowchart of a group dispatching method for a trunking communication system according to a fifth embodiment of the present disclosure.

Referring to FIGS. 8 and 9, FIG. 8 is a flowchart of a group dispatching method for a trunking communication system according to a fifth embodiment of the present disclosure. The method may be implemented in the trunking communication systems described in forgoing embodiments. The method may comprise operations described in blocks 91-93.

Block 91: When monitoring a group call from a second communication terminal 85 in the trunking communication system to a target group, the monitoring dispatch console 86 transmits a fourth call establishment message to the interconnection server 81.

The interconnection server 81 is configured to connect to another trunking communication system which does not belong to the trunking communication system. The monitoring dispatch console 86 is configured to monitor a group call initiated by the second communication terminal 85 in the trunking communication system. The fourth call establishment message comprises a group call number of the target group in the another trunking communication system.

As known by those of ordinary skills in the art, the system server 82 in the trunking communication system may be configured to, upon receipt of a specific group call number, transmit notification to a specific dispatch console. Thus, the system server 82 may be correspondingly configured such that the monitoring dispatch console 86 may monitor the group call from the second communication terminal 85 in the trunking communication system to the target group in the trunking communication system.

It is appreciated that, the group call number of the target group in the trunking communication system may be different from that of the target group in the another trunking communication system. The interconnection server 81 may store corresponding relation between the group call number of the target group in the trunking communication system and the group call number of the target group in the another trunking communication system.

Block 92: upon receipt of the fourth call establishment message, the interconnection server 81 establishes a call connection to the first communication terminal 84 of the target group in the another trunking communication system, selects an idle voice dispatch console 83 from the at least one voice dispatch console 83 as a service access point, and transmit a fifth call establishment message to the idle voice dispatch console 83.

The system server 82 may store corresponding information of the target group in the another trunking communication system. The interconnection server 81 may select one idle voice dispatch console 83 to initiate the call.

Block 93: When the idle voice dispatch console 83 receives the fifth call establishment message, a call connection is established between the idle voice dispatch console 83 and the interconnection server 81, and the idle voice dispatch console 83 establishes a call connection to the second communication terminal 85 through the system server 82 so as to receive and transmit voice.

After the second communication terminal 85 initiates the call, the monitoring dispatch console 86 may be utilized to transmit the fourth call establishment message to the interconnection server 81. The interconnection server 81 may select an idle voice dispatch console 83 to initiate the call and establish the call between the second communication terminal 85 and the target group. The implementation of the method may dynamically select the voice dispatch console 83 to initiate the call, which may achieve dynamic call services over different systems.

Figure 10:
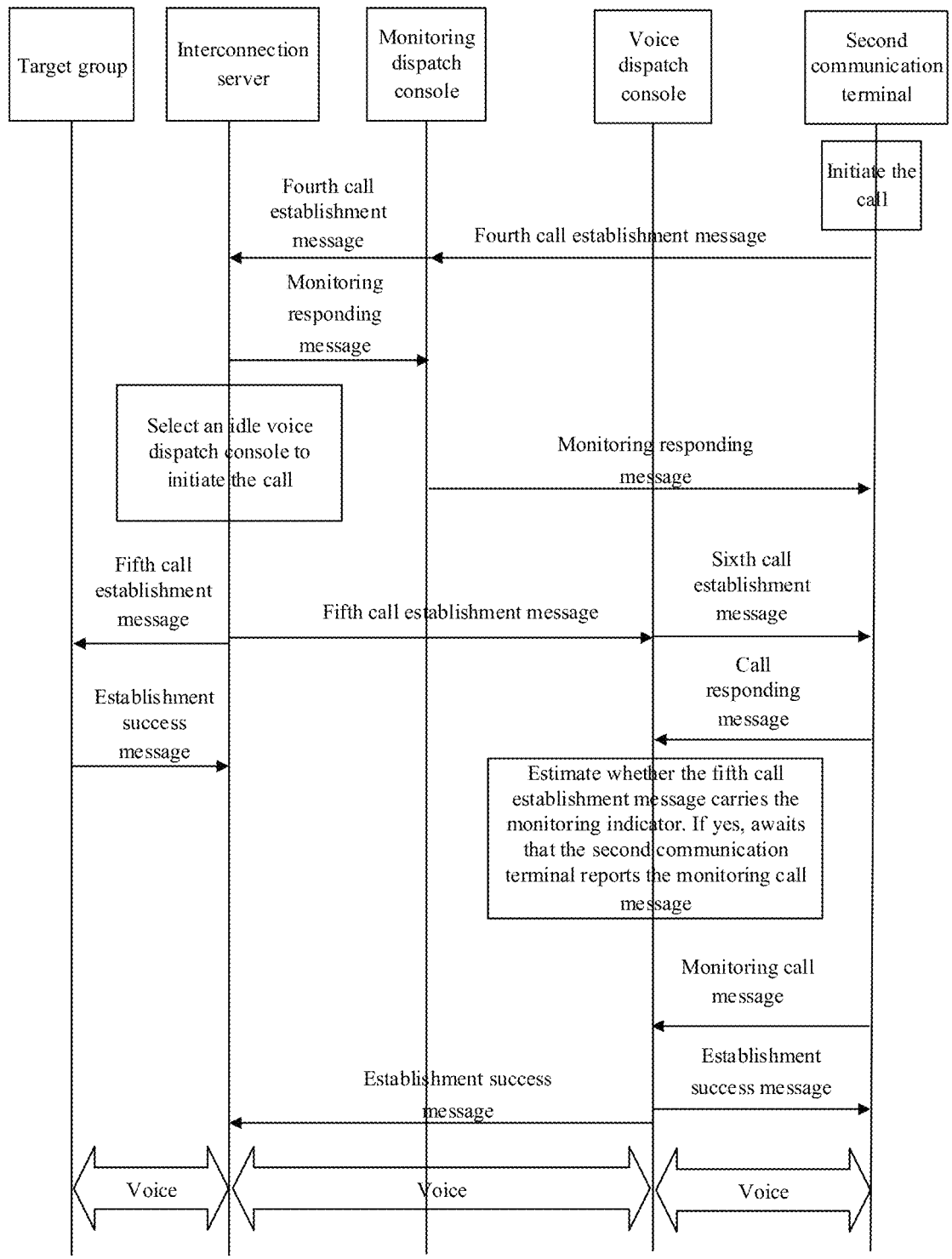
FIG. 10 is a flowchart of a group dispatching method for a trunking communication system according to a sixth embodiment of the present disclosure.

Referring to FIGS. 8 and 10, FIG. 10 is a flow chart of a group dispatching method for a trunking communication system according to a sixth embodiment of the present disclosure. This embodiment describes the process that the second communication terminal 85 request to establish a group call to a target group in another trunking communication system. The method comprises operations described in blocks 101-107.

Block 101: When monitoring that the second communication terminal 85 initiates a group call to the target group, the monitoring dispatch console 86 transmits a fourth call establishment message to the interconnection server 81.

The fourth call establishment message may comprise the group call number of the target group in another trunking communication system. The second communication terminal 85 initiates the call. Since the monitoring dispatch console 86 monitors the call message of the group when the call service is activated, the monitoring dispatch console 86 would capture the call message once the call message appears. Upon receipt of the fourth call establishment message, the monitoring dispatch console 86 reports it to the interconnection server 81.

Block 102: Upon receipt of the fourth call establishment message, the interconnection server 81 establishes a call connection between the second communication terminal 85 and the interconnection server 81.

Upon receipt of the fourth call establishment message, the interconnection server returns a responding message, i.e., a monitoring responding message to the monitoring dispatch console 86. The monitoring dispatch console 86 then transmits the monitoring responding message to the second communication terminal 85 through the system server 82.

Block 103: The interconnection server 81 select an idle voice dispatch console 83 from the at least one voice dispatch consoles 83.

When calling the target group, the interconnection server selects one idle voice dispatch console 83 from the at least one voice dispatch console 83 to initiate the call.

Block 104: The interconnection server 81 transmits a fifth call establishment message to the idle voice dispatch console 83.

The interconnection server 81 transmits the fifth call establishment message to the target group, at the same time the interconnection server 81 transmits the fifth call establishment message to the voice dispatch console 83. The fifth call establishment message comprises the group call number of the target group and a call monitoring indicator.

Block 105: The voice dispatch console 83 transmits a sixth call establishment message to the target group based on the fifth call establishment message.

Upon receipt of the fifth call establishment message from the interconnection server 81, the voice dispatch console 83 starts to monitor the call group, and transmits a sixth call establishment message to the second communication terminal 85 through the system server 82.

Block 106: The second communication terminal 85 transmits a responding message to the voice dispatch console 83.

Block 107: The voice dispatch console 83 verifies whether the fifth call establishment message carries the monitoring indicator. If yes, the voice dispatch console transmits an establishment success message to the interconnection server 81 and the second communication terminal 85 upon receipt of the call monitoring message transmitted by the second communication terminal 85.

The second communication terminal 85 return a call responding message to the voice dispatch console 83 through the system server 82. The voice dispatch console 83 verifies the received fifth call establishment message carries a monitoring indicator. If yes, the voice dispatch console 83 awaits that the second communication terminal 85 reports the monitoring call message through the system server 82. Upon receipt of the call monitoring message sent by the second communication terminal 85, the voice dispatch console 83 transmits the establishment success message to the second communication terminal 85 and the interconnection server 81 respectively.

After the interconnection server 81 receives the establishment success message sent by the voice dispatch console 83, the second communication terminal 85 may use the voice equipment 87 to receive and transmit voice, and transmit voice messages to the target group through the voice dispatch console 83 and the interconnection server 81.

For the another trunking communication system, one dispatch console may achieve multi-channel concurrency call services. For the trunking communication system, multiple dispatch consoles may be utilized for connection, the monitoring dispatch console 85 may connect to the system server 82 to monitor call messages, and the voice dispatch console 83 may connect to the system server 82 and the voice device 87 at the same time. The interconnection server 81 may be bounded to multiple second communication terminals 85 and the first communication terminal 84. After the service is activated, the monitoring dispatch console 86 may be utilized to monitor these groups. When monitoring the call message, the monitoring dispatch console 86 informs the interconnection server 81. The interconnection server 81 selects an idle voice dispatch console 83 to generate the call. Cooperation between multiple dispatch consoles may be utilized to dynamically select an idle voice dispatch console 83 to call the target group when the target group is performing group calls with the second communication terminal 85. Thus, call services over different systems may be achieved.

Figure 11:
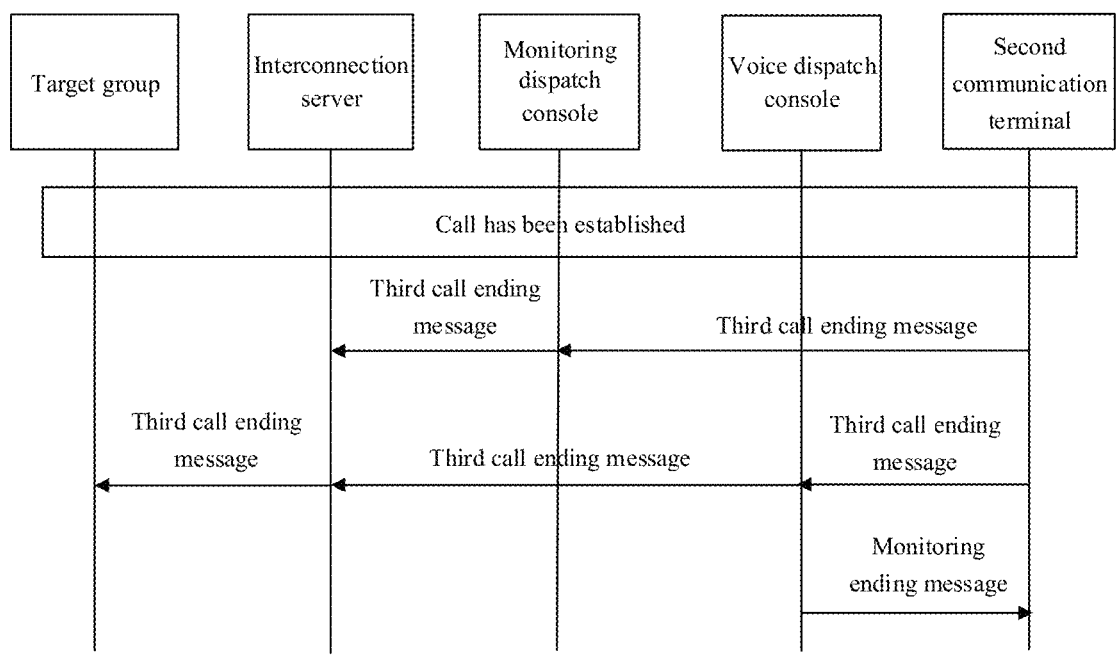
FIG. 11 is a flowchart of a group dispatching method for a trunking communication system according to a seventh embodiment of the present disclosure.

Referring to FIGS. 8 and 11, FIG. 11 is a flow chart of a group dispatching method for a trunking communication system according to a seventh embodiment of the present disclosure. This embodiment describes the process that the second communication terminal 85 hangs up the group call to the target group. The method may comprise operations described in blocks 111-112.

Block 111: The second communication terminal 85 transmits a third call ending message to the interconnection server 81 through the voice dispatch console 83 and the monitoring dispatch console 86 respectively.

When the group call is ongoing and the second communication terminal 85 initiates an ending request, the voice dispatch console 83 and the monitoring dispatch console 86 both receives a third call ending message sent by the second communication terminal 85 through the system server 82. The voice dispatch console 83 and the monitoring dispatch console 86 both report the third call ending message to the interconnection server 81.

Block 112: Upon receipt of the third call ending message, the interconnection server 81 transmits an ending request to the target group, and ends the voice connection between the second communication terminal 85 and the target group.

The interconnection server 81 only processes the third call ending message reported by the voice dispatch console 83, transmits the third call ending message to the target group, and stops or hangs up the group call to the target group.

Moreover, upon receipt of the third call ending message, the voice dispatch console 83 is in charge of cancelling monitoring the currently monitored group, and transmits the monitoring ending message to the second communication terminal 85 through the system server 82.

The voice dispatch console 83 and the monitoring dispatch console 86 in the trunking communication system are utilized as resources for interconnection. The voice dispatch console 83 may be utilized to establish voice channels for voice transmit. When the call is over, the voice link is released. The implementation of the present disclosure may make the best use of the voice dispatch console 83 and can achieve ending operation of the group call.

Figure 12:
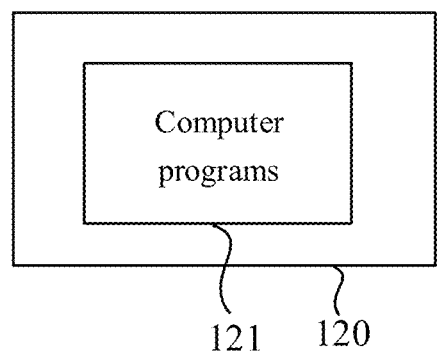
FIG. 12 is a schematic diagram of a storage medium according to an embodiment of the present disclosure.

Referring to FIG. 12, FIG. 12 illustrates a schematic diagram of a storage medium according to an embodiment of the present disclosure. The storage medium 120 may be utilized to store computer programs 121, which, when being executed by a processor, are configured to achieve the group dispatching method described in the forgoing embodiments.

The storage medium 120 may be any kind of medium capable of storing program codes such as server, USB disk, mobile hard disk, read-only memory (ROM), random access memory (RAM), magnetic disk or CD.

In the several embodiments provided in the present application, it should be understood that the disclosed system and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A group dispatching method for a trunking communication system, wherein the trunking communication system comprises an interconnection server, a system server and at least one voice dispatch console, wherein the method comprises:
   receiving, by the interconnection server, a first call establishment message from another trunking communication system other than said trunking communication system, wherein the first call establishment message corresponds to a group call from a first communication terminal of the another trunking communication system to a target group, wherein the target group comprises a plurality of second communication terminals;
   upon receipt of the first call establishment message by the interconnection server, establishing, by the interconnection server, a call connection with the first communication terminal, selecting, by the interconnection server, an idle voice dispatch console from the at least one voice dispatch console as a service access point, and transmitting, by the interconnection server, a second call establishment message to the idle voice dispatch console, wherein the second call establishment message comprises a group call number of the target group;
   upon receipt of the second call establishment message by the idle voice dispatch console, establishing, by the interconnection server, a call connection with the idle voice dispatch console; and establishing, by the interconnection server, a call connection with a second communication terminal of the target group in said trunking communication system through the system server so as to transmit and receive voice.

2. The method of claim 1, further comprising:
   transmitting, by the first communication terminal, a first call ending message to the interconnection server through the voice dispatch console;
   upon receipt of the first call ending message by the interconnection server, sending, by the interconnection server, a talk right release message to the voice dispatch console;
   determining, by the voice dispatch console, whether the second communication terminals of the target group has talk right;
   if it is determined that the second communication terminal has talk right, ending, by the target group, the call connection and transmitting a call ending message to the interconnection server when an idle period of the call connection of the target group is larger than a preset period, and
   stopping, by the voice dispatch console, monitoring the target group.

3. The method of claim 1, wherein the trunking communication system further comprises a monitoring dispatch console, wherein the method further comprises:
   transmitting, by the first communication terminal, a second call ending message to the interconnection server;
   upon receipt of the second call ending message, sending, by the interconnection server, a talk right release message to the voice dispatch console;
   determining, by the voice dispatch console, whether the second communication terminals of the target group has talk right;
   when an idle period of the call connection is no larger than a preset period and at least one of the second communication terminals applies for talk right, transmitting, by the monitoring dispatch console, a talk right message to the interconnection server;
   upon receipt of the talk right message, sending, by the interconnection server, a third call establishment message to the first communication terminal, and establishing, by the interconnection server, a call connection with the first communication terminal so as to receive and transmit voice.

4. The method of claim 1, wherein a group call number of the target group in the trunking communication system is different from or the same as a group call number of the target group in the another trunking communication system; the interconnection server stores a corresponding relation between the group call number of the target group in the trunking communication system and the group call number of the target group in the another trunking communication system, and the method further comprises:

converting the group call number of the target group in the another trunking communication system into the group call number of the target group in the trunking communication system, when the group call number of the target group in the trunking communication system is different from the group call number of the target group in the another trunking communication system.

5. The method of claim 1, wherein
the trunking communication system is a Trans European Trunked Radio (Tetra) system, and the another trunking communication system is a Police Digital Trunk (PDT) system.

6. The method of claim 1, wherein information of the target group in the trunking communication system or information of the target group in the another trunking communication system is stored in the system server.

7. A trunking communication system, comprising:
an interconnection server configured to receive a first call establishment message initiated by a first communication terminal in another trunking communication system to a target group, wherein the another trunking communication system is not the trunking communication system, wherein the target group comprises a plurality of second communication terminals; wherein upon receipt of the first call establishment message, the interconnection server establishes a call connection with the first communication terminal, selects an idle voice dispatch console from at least one voice dispatch console as a service access point, and transmits a second call establishment message to the idle voice dispatch console, wherein the second call establishment message comprises a group call number of the target group;
a system server configured to establish connection between the voice dispatch console and a second communication terminal of the target group in the trunking communication system; and
the at least one voice dispatch console configured to, when the at least one voice dispatch console receives the second call establishment message, establish a call connection with the interconnection server, and establish a call connection to the second communication terminal of the target group in the trunking communication system through the system server so as to transmit and receive voice.

8. A non-transitory computer storage medium, the computer storage medium stores at least one computer instruction, wherein the at least one instruction is configured to implement operations of a group dispatching method applied to a trunking communication system, the group dispatching method comprises:
receiving, by a interconnection server, a first call establishment message from another trunking communication system other than said trunking communication system, wherein the first call establishment message corresponds to a group call from a first communication terminal of the another trunking communication system to a target group, wherein the target group comprises a plurality of second communication terminals;
upon receipt of the first call establishment message, establishing, by the interconnection server, a call connection with the first communication terminal, and
selecting, by the interconnection server, an idle voice dispatch console from the at least one voice dispatch console as a service access point, and
transmitting, by the interconnection server, a second call establishment message to the idle voice dispatch console, wherein the second call establishment message comprises a group call number of the target group;
upon receipt of the second call establishment message by the idle voice dispatch console, establishing, by the idle interconnection server, a call connection with the idle voice dispatch console;
establishing, by the interconnection server, a call connection with a second communication terminal of the target group in said trunking communication system through a system server so as to transmit and receive voice.

9. The non-transitory computer storage medium of claim 8, wherein the group dispatching method further comprises:
transmitting, by the first communication terminal, a first call ending message to the interconnection server through the voice dispatch console;
upon receipt of the first call ending message, sending, by the interconnection server, a talk right release message to the voice dispatch console;
determining, by the voice dispatch console, whether the second communication terminals of the target group has talk right;
if it is determined that the second communication terminal has talk right, ending, by the target group, the call connection and transmitting a call ending message to the interconnection server when an idle period of the call connection of the target group is larger than a preset period, and
stopping, by the voice dispatch console, monitoring the target group.

10. The non-transitory computer storage medium of claim 8, wherein the method further comprises:
transmitting, by the first communication terminal, a second call ending message to the interconnection server;
upon receipt of the second call ending message, sending, by the interconnection server, a talk right release message to the voice dispatch console;
determining, by the voice dispatch console, whether the second communication terminals of the target group has talk right;
when an idle period of the call connection is no larger than a preset period and at least one of the plurality of second communication terminals applies for talk right, transmitting, by a monitoring dispatch console, a talk right message to the interconnection server;
upon receipt of the talk right message, sending, by the interconnection server, a third call establishment message to the first communication terminal, and
establishing, by the interconnection server, a call connection with the first communication terminal so as to receive and transmit voice.

11. The non-transitory computer storage medium of claim 8, wherein a group call number of the target group in the trunking communication system is different from or the same as a group call number of the target group in the another trunking communication system.

12. The non-transitory computer storage medium of claim 11, wherein the interconnection server stores a corresponding relation between the group call number of the target group in the trunking communication system and the group call number of the target group in the another trunking communication system.

13. The non-transitory computer storage medium of claim 12, wherein the method further comprises converting the group call number of the target group in the another trunking communication system into the group call number of the target group in the trunking communication system, when the group call number of the target group in the trunking communication system is different from the group call number of the target group in the another trunking communication system.

14. The non-transitory computer storage medium of claim 8, wherein the method further comprises:
- when detecting, by the monitoring dispatch console, that a second communication terminal initiates a group call to a target group,
- transmitting, by a monitoring dispatch console, a fourth call establishment message to the interconnection server, wherein the fourth call establishment message comprises a group call number of the target group;
- upon receipt of the fourth call establishment message, establishing, by the interconnection server, a call connection to a first communication terminal of the target group in the another trunking communication system,
- selecting, by the interconnection server, an idle voice dispatch console from the at least one voice dispatch console as a service access point, and transmitting, by the interconnection server, a fifth call establishment message to the idle voice dispatch console;
- upon receipt of the fifth call establishment message, establishing, by the idle voice dispatch console, a call connection with the interconnection server, and establishing, by the idle voice dispatch console, a call connection with the second communication terminal through the system server to receive and transmit voice.

\* \* \* \* \*